United States Patent [19]
Vaughan et al.

[11] Patent Number: 5,185,136
[45] Date of Patent: Feb. 9, 1993

[54] TRIVALENT TRANSITION-METAL-ALUMINOSILICATE HYDROCARBON CONVERSION CATALYSTS HAVING MAZZITE-LIKE STRUCTURES, ECR-23-T (C-2491)

[75] Inventors: David E. W. Vaughan, Flemington; Karl G. Strohmaier, Port Murray, both of N.J.

[73] Assignee: Exxon Research and Engineering Co., Florham Park, N.J.

[21] Appl. No.: 746,265

[22] Filed: Aug. 15, 1991

Related U.S. Application Data

[63] Continuation of Ser. No. 554,629, Jul. 18, 1990, abandoned, which is a continuation-in-part of Ser. No. 281,863, Dec. 5, 1988, abandoned, which is a continuation of Ser. No. 14,204, Feb. 4, 1987, abandoned, which is a continuation of Ser. No. 763,651, Aug. 8, 1985, abandoned.

[51] Int. Cl.$^5$ ............................................. C01B 33/34
[52] U.S. Cl. ..................................... 423/702; 502/77; 502/74; 208/46; 208/137
[58] Field of Search .................... 423/328, 329, 326; 502/60, 66, 71, 74, 77; 208/46, 137

[56] References Cited

U.S. PATENT DOCUMENTS

| | | | |
|---|---|---|---|
| 3,941,871 | 3/1976 | Dwyer et al. | 423/326 |
| 4,021,447 | 5/1977 | Rubin et al. | 423/328 |
| 4,208,305 | 6/1980 | Kouwenhoven et al. | 423/328 |
| 4,420,467 | 12/1983 | Whittam | 423/328 |
| 4,552,731 | 11/1985 | Vaughan | 423/328 |
| 4,556,549 | 12/1985 | Valyocsik | 423/328 |
| 4,564,511 | 1/1986 | Desmond et al. | 423/328 |
| 4,576,805 | 3/1986 | Chang et al. | 423/328 |

FOREIGN PATENT DOCUMENTS

| | | | |
|---|---|---|---|
| 0064328 | 11/1982 | European Pat. Off. | 502/60 |
| 1117568 | 6/1968 | United Kingdom | 423/328 |
| 2024790 | 1/1980 | United Kingdom | 423/326 |
| 2033358 | 5/1980 | United Kingdom | 423/328 |

*Primary Examiner*—R. Bruce Breneman
*Attorney, Agent, or Firm*—Ronald D. Hantman

[57] ABSTRACT

This invention relates to novel zeolitic compositions having transition metals as well as aluminum and silicon in the framework tetrahedral positions. The composition has a structure similar to mazzite type zeolites. The invention also involves a process of preparation in which at least one transition metal is directly synthesized into the product.

32 Claims, 1 Drawing Sheet

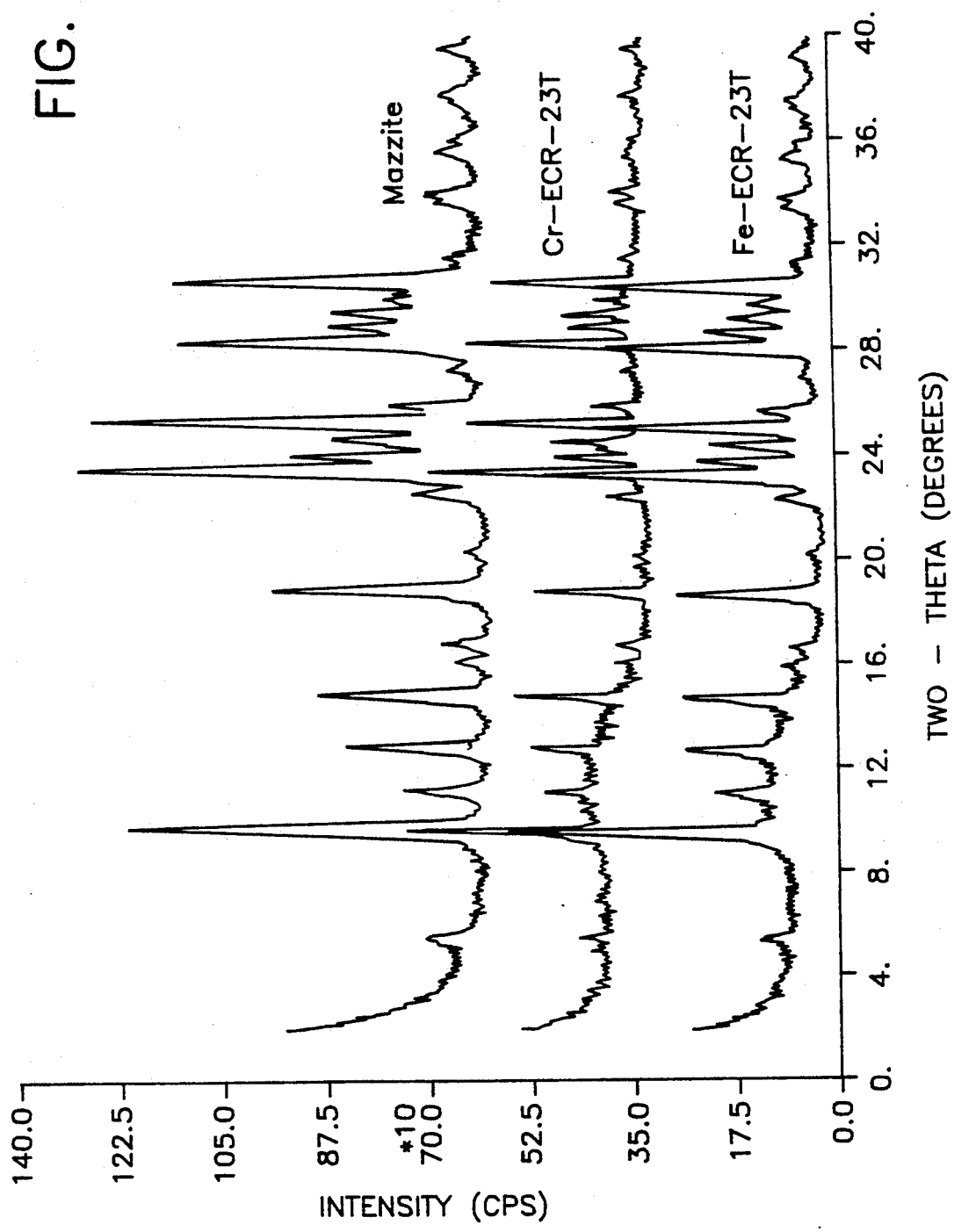

TRIVALENT TRANSITION-METAL-ALUMINOSILICATE HYDROCARBON CONVERSION CATALYSTS HAVING MAZZITE-LIKE STRUCTURES, ECR-23-T (C-2491)

CROSS REFERENCE TO RELATED APPLICATIONS

This is a Rule 60 Continuation of U.S. Ser. No. 554,629 filed Jul. 18, 1990, now abandoned, which is a continuation-in-part of U.S. Ser. No. 281,863 filed Dec. 5, 1988, now abandoned, which is a Rule 62 continuation of U.S. Ser. No. 014, 204 filed Feb. 4, 1987 (abandoned Dec. 5, 1988), which is a Rule 62 Continuation of U.S. Ser. No. 763,651 filed Aug. 8, 1985 (abandoned Feb. 4, 1987).

FIELD OF THE INVENTION

This invention relates to novel zeolitic catalyst compositions having trivalent and, optionally, divalent transition metals as well as aluminum and silicon in the framework tetrahedral positions. The compositions have structure similar to mazzite zeolites. The invention also involves a process of preparation in which one or more transition metals is directly synthesized into the product, and the product is ion exchanged and fabricated into a catalyst suitable for such petroleum and petrochemical conversion reactions as reforming, isomerization and hydrocracking, particularly of sulfur containing feedstocks.

BACKGROUND OF THE INVENTION

Zeolites, although generally viewed as having broad compositional substitution possibilities (Pure and Appl. Chem. (1979), 51, p. 1091), are usually defined as crystalline hydrated aluminosilicates of Group I and Group II elements. In particular, those elements include sodium, potassium, calcium, magnesium, barium and strontium. The structure of zeolites is typically an aluminosilicate framework based on an indefinitely extending three dimensional network of $AlO_4$ and $SiO_4$ tetrahedra linked to each other by sharing of the corner oxygens. Zeolites are often represented by the empirical formula $M_{2/n}O.Al_2O_3.xSiO_2 . y H_2O$. In this oxide formula, x is generally greater or equal to 2 since $AlO_4$ tetrahedra are joined only to $SiO_4$ tetrahedra, and n is the Group I or Group II cation valence. The framework contains channels and interconnected voids which may be occupied by the cation and by water molecules. The cations are often quite mobile and may be exchanged by other cations. Intracrystalline zeolitic water may be reversibly removed. In some zeolites, cation exchange or dehydration may produce structural changes in the framework.

Much zeolite research has focused on the synthesis of zeolite frameworks containing elements other than silicon and aluminum. It is known that gallium ions and germanium ions may be substituted for aluminum and silicon cations in the framework. While an extensive family of aluminum-phosphorus zeolites (AlPO's) and silicon-substituted forms (SAPO's) have recently been synthesized, the substitution of other elements is the subject of major controversy in the zeolite literature. For instance, U.S. Pat. Nos. 3,329,480 and 3,329,481 both issued to D. A. Young, report the existence of crystalline zirconosilicate and titanosilicate zeolites. A zeolite having chromium in the tetrahedral positions has been described by Yermolenko et al at the Second Oil Union Conference on Zeolites, Leningrad, 1964, pages 171-8 (published 1965). However, D. W. Breck, in Zeolite Molecular Sieves, p. 322, John Wiley & Sons (1974) suggests that the chromium present was not present in a zeolite A structure and furthermore was present as an impurity in insoluble form. The impurity was said to be in the form of a chromium silicate as confirmed by the nature of the water vapor adsorption isotherm. This subject has been reviewed by Barrer, "Hydrothermal Chemistry of Zeolites", Academic Press, (1982), p. 294.

Because of the presence of phosphorus in tetrahedral $PO_4$ units in certain rare zeolites, extensive work has been done to synthesize zeolites containing $PO_4$ tetrahedra. Various phosphorus-containing zeolites have been prepared and reported in Breck, supra, p. 323 et seq. The synthesis technique for production of phosphorus-containing zeolites generally involves crystallization from a gel in which the phosphorus is first incorporated by a controlled copolymerization and co-precipitation of all of the component oxides in the framework, i.e., aluminate, silicate, and phosphate in the homogeneous gel phase. The crystallization of the gel is then carried out at a temperature between 80° and 210° C.

The synthesis of major iron-containing zeolitic structures has been reported. Japanese Kokai 59,121,115, published Jul. 13, 1984, disclosed an aluminosilicate having a faujasite structure and containing coordinated iron. The chemical composition is said to be of the formula $aM_{2/n}O.bFe_2O_3.Al_2O_3.cSiO_2$ where M can be H, alkali metal or alkaline earth metal. The symbol n is the valence of M; $a=1\pm0.3$; c is between 4.6 and 100; and a is less than b and both are less than 7. The relation between the IR absorption wave number (y) in $cm^{-1}$ and the crystal lattice parameter $a_o$ is said to be expressed as $Y \leq -116.7a_o + 3920$.

Similarly, U.S. Pat. No. 4,208,305 (Eur. Pat. No. 115,031.A) discloses a crystalline ferrosilicate having the general formula:

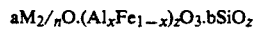

$$aM_{2/n}O.(Al_xFe_{1-x})_zO_3.bSiO_z$$

where M is a cation of valence n, $a=0-2.0$, $b=3-100$ and $z=0-0.98$. The composition is said to have a uniform pore diameter of 4–5Å and a characteristic x-ray powder diffraction pattern of:

| 2θ | d(Å) | Rel. Intensity |
|---|---|---|
| 10.9–11.1 | 8.12–7.97 | M–VS |
| 13.4–13.5 | 6.61–6.56 | M–S |
| 17.4–17.5 | 5.10–5.07 | M–S |
| 21.0–21.1 | 4.23–4 21 | M–S |
| 22.0–22.1 | 4.40–4.02 | M–VS |
| 20.6 | 3.121 | M–S |
| 32.3–32.4 | 2.772–2.763 | M–S |

(VS = very strong; S = strong; M = medium)

The composition is formed by maintaining a mixture having a molar oxide composition of: $0-10\ R_2O:1-15\ M_{2/n}:(Al_xFe_{1-x})_2O_3:10-200\ SiO_2:200-1000\ H_2O$ where R is an organic templating agent.

A range of metallo-alumino-phosphates and metallo-silico-alumino-phosphates compositions have recently been reviewed (Flanigen et al, in "Innovations in Zeolite Materials Science", Ed. Grobet et al, SSSC v.37, p.13, (Elsevier)), The structure and composition of this invention has not been reported in such families of materials.

None of this literature discloses a transition-metal-aluminosilicate composition having a mazzite-like structure, having the chemical composition disclosed herein, and its use as a hydrocarbon conversion catalyst.

SUMMARY OF THE INVENTION

This invention deals with a composition of matter comprising a transition-metal-aluminosilicate hydrocarbon conversion catalyst having a mazzite-like zeolite structure. The transition-metal is present in a substantial portion of the tetrahedral sites of the zeolitic structure. The generalized chemical composition is:

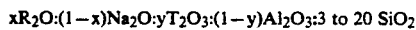

where:
x is between 0.05 and 0.4,
y is between 0.05 to 0.7,
R represents one or more of a tetramethylammonium (TMA) cation, bis-dihydroxyethyldimethylammonium, triethylenediamine, 1,14 diazobicyclo (2,2,2) octane, choline, pyrrolidine, and
T is at least one trivalent transition metal, e.g., Fe, Cr.

A variation of the invention includes the materials wherein divalent as well as trivalent metals are present in the framework. The general formula is:

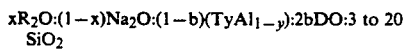

where
x, R, T, y are as above,
D is one or more divalent metals (preferably Ni, Co or Zn), and
$0.01 \leq b < 0.5$.

In addition, gallium may be substituted for aluminum and germanium substituted for silicon; $Li_2O$ and/or $K_2O$ may replace, to a moderate extent, some of the $Na_2O$. When divalent metals are added to the reaction mixture, the product typically has the divalent metals partitioned between the cationic sites and the framework sites. Furthermore, depending upon the extent of organic molecule clathration (either neutral molecule or organic salt) the apparent cation balance may deviate from unity.

The process for synthesizing the inventive transition-metal-aluminosilicate catalysis involves direct introduction of the trivalent metal and, optionally, the divalent metal into the structure as the material is crystallized.

Experiments with these materials reacted with $H_2S$ at high temperatures show that the transition metal in the framework reacts to form the metal sulfide, but that such framework depletion of T atoms does not cause the framework to collapse in the cases of single channel restricted pore systems. (In contrast, in the case of more open and less rigid faujasite frameworks, the lattice does collapse rendering the zeolite amorphous or significantly degraded.) This unique reactivity towards $H_2S$ allows these transition metal substituted materials to act as sulfur absorbers, or sinks and scavengers, under reaction conditions and therefore to protect the noble metal (usually Pt or Pd) from deactivation due to sulfur containing feedstocks in catalytic applications. We have discovered that such transition metal framework substituted zeolites seem to be "protected" catalysts as they do not show the deterioration in catalytic activity expected from catalysts containing such high transition metal contents, and may have significant selectivity advantages in some operations. In most hydrocracking, reforming and isomerization systems hydrogen is recycled after removal of most contaminants, such as sulfur compounds, in an external purification system (usually a fixed bed cyclic absorbent process). Sulfur is the major contaminant which poisons the active catalyst promoters. The transition metal framework substituted zeolites of this invention clearly offer the advantages of acting as a polishing sulfur trap in the catalyst itself providing additional sulfur protection in case of process upsets, inadequate pretreatment or feed contamination. They would seem to offer unique advantages in the instances where the noble metal is particularly sensitive to poisoning, as in the case, for example, of aromatization of paraffinic feedstocks reported by Hughes and co-workers (Proc. 7th. International Zeolite Conf., Ed. Murakami et al, p.725, (1986), Kodansha/Elsevier, (Tokyo)).

BRIEF DESCRIPTION OF THE DRAWINGS

FIG. 1 compares the X-ray diffraction patterns of, respectively, a mazzite zeolite and several transition-metal-aluminosilicates made according to the invention.

DESCRIPTION OF THE PREFERRED EMBODIMENTS

The invention herein is, in general terms, an ion exchanged transition-metal-aluminosilicate hydrocarbon conversion catalyst having transition-metals in a substantial portion of the tetrahedral positions in a mazzite-type structure.

A more desirable composition of matter, when only a trivalent metal is substituted, has a chemical makeup in the range:

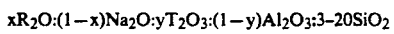

where:
x is between 0.05 and 0.4,
y is between 0.05 and 0.7,
R is one or a mixture of tetraethylammonium (TMA) cation, bis-dihydroxyethyl-dimethylammonium, triethylenediamine, 1,4 diazobicyclo (2,2,2) octane, choline, pyrrolidine, and
T is at least one trivalent transition metal, e.g., Fe, Cr.

A variation of the invention includes the materials wherein divalent as well as trivalent metals are present in the framework. The general formula is:

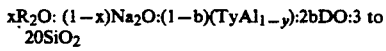

where
x, R, T, y are as above,
D is one or more divalent metals (preferably Ni, Co or Zn), and $0.01 \leq b < 0.5$.

In addition, gallium may be substituted for aluminum and germanium substituted for silicon; $Li_2O$ and/or $K_2O$
may replace, to a moderate extent, some of the $Na_2O$. When divalent metals are added to the reaction mixture, the product typically has the divalent metals partitioned between the cationic sites and the framework sites. Furthermore, depending upon the extent of organic molecule clathration (either neutral molecule or organic salt) the apparent cation balance may deviate from unity.

Each of these compositions is quite similar in structure to the mazzite-type structure but having other metal ions in tetrahedral framework positions in addition to $Al^{3+}$ and $Si^{4+}$. As will be discussed below, the structure of this transition-metal-aluminosilicate, ECR-23-T, has two distinctly different tetrahedral positions. Given the size and electronic differences between, say, Fe and Si, the silicon ions might be expected to segregate to one position and the iron ions to the other. However, none of the presently available instrumental techniques has definitively confirmed this possibility.

Mazzite-type materials are considered to include the mineral itself as well as its alumino-silicate isostructure ZSM-4 (British Patent 1,117,568) and zeolite omega (British Patent 1,178,186). Although there are theoretical proposals for the structure of zeolite omega (Barrer and Villiger, Chem. Soc. Chem. Comm. (1969), p. 659), the later discovery of the mineral mazzite and the solution of its structure (Galli, Cryst. Struct. Comm., (1974), 3, p. 339) led to the conclusion that mazzite, omega and ZSM-4 are isostructural aluminosilicate zeolites (Meier and Olson, "Atlas of Zeolite Structure Types", International Zeol. Assoc. Structure Comm. (1978)). Differentiation of mazzite and the theoretical omega structure (which has recently reported as a mineral found in the USSR (Rinaldi, Proc. 6th Int. Zeol. Conf., Ed. Bisio and Olson)) is difficult, and although the products of this invention are presumed to be similar to mazzite, they may also embrace the theoretical omega structure on the basis of available data. ECR-23-T may be one or the other, or quite possibly, mixtures of intergrowths of both structural types, but containing significant $Fe^{3+}$, $Cr^{3+}$, and, optionally, $Ni^{2+}$, $Co^{2+}$ and $Zn^{2+}$, in tetrahedral framework positions in addition to $Al^{3+}$, $Si^{4+}$, $Ga^{3+}$ or $Ge^{+4}$.

The structure has a large open channel and in various ion exchanged forms may be expected to have important catalytic applications in such areas as cracking, isomerization, dewaxing, reforming, polymerization and Fischer-Tropsch synthesis chemistry. Prior art alumino-silicates of this type have been successfully evaluated in many such applications (e.g., British Patents 1,210,335 and 1,211,973; U.S. Pat. Nos. 3,914,331; 3,923,639; and 4,021,447). Iron impregnated and/or exchanged forms of ECR-23-T should be particularly useful catalysts for hydrocarbon synthesis from CO and $H_2$ mixtures because of the possibility of interactions between framework $Fe^{3+}$ or iron oxyhydroxide species resulting from deferration of the lattice, and the impregnated or exchanged species.

Furthermore, it is anticipated that this transition-metal-aluminosilicate catalyst, ECR-23-T, may provide the basis of various processes for forming high silica zeolites in that the transition metals may be easier to remove by acid leaching of the framework by virtue of the higher solubility of the transition metals in acidic solutions and a lower tendency to form polymeric species at acid pH. Similarly, hydrothermal treatment of these metallo-aluminosilicates should preferentially hydrolyze at the framework transition metal, making it more readily removable, and thus enhance the silica content of the framework.

The transition-metallo-aluminosilicate catalyst of this invention may be prepared by forming a reaction mixture comprising an alumina source, a silica source, a transition metal source, a sodium oxide source, an organic templating source, and, optionally, a source of nucleation seeds.

The sodium oxide source may be its silicates or its hydroxides. The silica may be derived from a wide variety of sources. For instance, the source may be a silica gel, silicic acid, aqueous colloidal silica sols, fume silicas and chemically precipitated silica sols. The sodium and silica may be derived from a single source such as sodium silicate.

The alumina source may be sodium aluminate, metakaolin, alumina, hydrated alumina, aluminum alkoxide or the like.

The trivalent transition metal source may be any trivalent transition-metal-containing soluble salt of a strong acid, e.g. nitrates, chlorides, sulfates, etc. The divalent transition metal source may be a soluble salt containing $Ni^{2+}$, $Co^{2+}$ or $Zn^{2+}$.

The templating agent may be a hydroxide or salt of tetramethylammonium, bis-dihydroxyethyldimethylammonium, triethylenediamine, or 1,4 diazo bicyclo (2,2,2) octane, pyrrolidine, or chloline. Use of a seeding mixture is preferred. The seeds may be microcrystalline-mazzite-like products, ECR-23-T or nucleation slurries of the types described in U.S. Pat. Nos. 3,433,589; 3,574,538; and 4,178,353. Seeding is effective in this system when used at a level equivalent to between 0.1 and 10% based on weight of product. Although cold aging will initiate the formation of the desired phase in part of the composition range, it is less time-effective than the seeding procedure.

The relative amounts of ingredients in the reaction mixture will be such that the mixture has a composition, in terms of mole ratios of oxides, within the following ranges:

| Oxide Constituents | General Ranges | Preferred Ranges |
|---|---|---|
| $SiO_2:Al_2O_3$ | 3 to 30 | 4 to 15 |
| $T_2O_3:Al_2O_3$ | 0.02 to 4 | 0.02 to 2 |
| $Na_2O:(Al_2O_3 + T_2O_3)$ | 1.4 to 6 | 1.8 to 4 |
| $H_2O:(Al_2O_3 + T_2O_3)$ | 80 to 400 | 100 to 250 |
| $R_2O:(Al_2O_3 + T_2O_3)$ | 0.02 to 3.0 | 0 02 to 1.0 |
| $DO:(Al_2O_3 + T_2O_3)$ | 0 to 4 | 0 to 2 |

Although the order of mixing of the ingredients is not believed to be critical, apart from the necessity of adding the acidic metal salts last, in that the ingredients may be added simultaneously or sequentially, the preferred method is somewhat more involved.

The preferred method involves preparation of a sodium aluminate solution by dissolving the alumina source in a hot concentrated sodium hydroxide solution. Preferably, the temperature is between about 70° C. and about 100° C. The aluminate is then cooled.

The transition metal sources are dissolved in water, possibly acidified with an acid having an anion the same as the dissolved metal source.

The sodium aluminate solution is then mixed, preferably with vigorous stirring, with a sodium silicate solution. The seeds and organic templating agent are slowly added to the stirred mixture. The transition metal solution is then slowly added to the resulting mixture, also with vigorous mixing.

The resulting reaction mixture is then placed in a reactor, ordinarily one which can withstand elevated pressures, e.g., a polytetrafluoroethylene-lined jar or autoclave. The mixture is maintained at a temperature between about 70° C. and 250° C., preferably between about 90° C. and 180° C. The exact temperature will, of course, depend upon the amount of alkali oxides present and the length of time available for reaction.

When the homogenized mixture is heated, it is maintained at the autogeneous pressures resulting from the temperature employed. The length of time required to produce the product crystals will depend mainly upon temperatures employed. At the reaction parameters, the time required for reaction is generally in the range of 12 to 64 hours. Broadly, the heating will take place for as long as is desired or necessary to produce crystals of the desired product.

The product crystals may be recovered by, e.g., filtration or centrifugation, and are then washed to remove extra mother liquor. The washing should continue, with the wash water equilibrated with the product crystals, until the water has a pH between about 9 and about 12. The crystals may then be dried. Calcination, in an oxygen-containing atmosphere, at 400° to 600° C. will remove the organic template. This is then followed by ion exchange into a suitable cation exchange form.

The composition of this invention may be used as a sorbent or a catalyst. In either of these applications, it may be desirable, or even necessary, to exchange the non-tetrahedral sites within the composition with cations from any of one or more members of Groups I through VIII of the Periodic Table or the rare earth metals, depending upon the intended end use. Preferably, the cations will be mono-, di-, or trivalent metal cations, particularly from Groups I, II or III of the Periodic Table, such as barium, calcium, cesium, lithium, magnesium, sodium, potassium, strontium, zinc or the like. Hydrogen, rare earth metals, or ammonium ions may be used in certain instances. The ions may be exchanged before or after calcination of the composition. The presence of these exchangeable cations will not generally cause a substantial change in the structure of the product ECR-23-T catalyst compositions.

The exchanged ECR-223T catalysts are fabricated into extrusions, pills, spheres, granules or other suitable catalyst form by mixing with an inert binder material followed by any of the well known forming procedures well known in the art, such as extruding, pilling, etc. In such cases the binder will usually comprise between 2 and 40% wt. of an inorganic oxide; clays, such as kandites, smectites etc.; or graphite, long chain fatty acids and similar inert lubricants. In some cases, often with careful choice of the cation exchanged form, the catalyst may be self bound, that is prepared with no binder material, particularly in the case of pressure pilling or tableting. Additional catalytic metals of Group 8 of the Periodic Table may be impregnated onto, or into, the catalyst either before or after this forming operation.

As noted above, the active product composition of this invention is substantially isostructural with or has a mazzite-like structure except that a substantial amount of one or more transition metals is found in the tetrahedral framework positions. When divalent transition metals are added to the synthesis mixture, the trivalent metal goes substantially into the framework sites; the divalent transition metal may partition between framework and cation sites. The more desirable catalyst promoter "as synthesized" composition has a chemical formula in the range

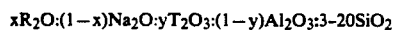

where
x is between 0.05 and 0.4,
y is between 0.05 and 0.7,
R is one or a mixture of tetraethylammonium (TMA) cation, bis-dihydroxyethyl-dimethylammonium, triethylenediamine, choline, pyrrolidine, or 1,4 diazo-bicyclo (2,2,2) octane, and
T is at least one trivalent transition metal, e.g., Fe, Cr.

A variation of the invention includes the materials wherein divalent as well as trivalent metals are present in the framework. The general formula is:

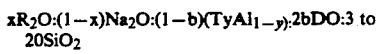

where
x, R, T, y are as above,
D is one or more divalent metals (preferably Ni, Co or Zn), and $$0.01 \leq b < 0.5.$$

When divalent metals are added to the reaction mixture, the product typically has the divalent metals partitioned between the cationic sites and the framework sites. Furthermore, depending upon the extent of organic molecule clathration (either neutral molecule or organic salt) the apparent cation balance may deviate from unity.

The typical X-ray powder diffraction pattern is thus:

TABLE 1

| dÅ(+5%) | Rel. Int. |
|---|---|
| 9.13 | VS |
| 7.89 | M-S |
| 6.88 | M-S |
| 5.97 | S |
| 4.70 | M-S |
| 3.80 | VS |
| 3.71 | M |
| 3.62 | M |
| 3.52 | S-VS |
| 3.44 | W |
| 3.15 | S |
| 3.09 | W-M |
| 3.03 | W-M |
| 2.98 | W |
| 2.92 | S |
| 2.65 | W |
| 2.63 | W |

(VS = very strong; S = strong; M = medium; W = weak)

Based on these and other data, the average hexagonal unit cell size is believed to be about 18.26(±0.2)Å along the 'a' axis and about 7.65Å along the 'c' axis. The pore size is about 6Å. The inventive product is capable of adsorbing, after heating in air at moderate temperatures, e.g., 400° C., for dehydration, an amount of hexane equal to at least 3% by weight, and water in an amount greater than about 10% by weight.

EXAMPLES

The following examples illustrate the invention without limiting it in any way. In each of the examples, parts and percentages are given by weight and temperature is given in degrees Centigrade, unless otherwise noted.

EXAMPLE 1

A typical seed composition was made by dissolving 12.02 gm aluminum oxide trihydrate in a solution of 60 gm NaOH in 100 gm H$_2$O at 100° C. After complete dissolution of the alumina, the solution was cooled to room temperature and added, with vigorous mixing, to a dilute solution of sodium silicate (126.3 gm H$_2$O+201.6 gm 'N' Brand (P.Q. Corp.) sodium silicate). After homogenization, the solution was allowed to age prior to use as a nucleant slurry.

EXAMPLE 2

A gel composition having the stoichiometry:

1.6TMACl:4Na$_2$O:0.67Al$_2$O$_3$:0.33Fe$_2$O$_3$:12SiO$_2$:180H$_2$O was produced by mixing 9.8 gms sodium aluminate and 0.4 gms NaOH in 25 gms H$_2$O. To this was added 155.8 gms sodium silicate (P.Q. Corp. N Brand) and 28.8 gms of the nucleating solution of Example 1. The mixture was placed in a blender and homogenized. The following materials were slowly added with vigorous mixing:
17.9 gm Fe(NO$_3$)$_3$9H$_2$O dissolved in 20 gm H$_2$O
11.7 gm Tetramethylammonium chloride (TMA Cl)
Sufficient H$_2$O to bring the total weight to 311.7 gms. Part of this sample (A) was reacted in a Teflon autoclave at 150° C. for 16 hours, after which time it was cooled, filtered, washed and dried. X-ray diffraction analysis showed the sample to be excellent synthetic ECR-23-T as shown in Table 2 and FIG. 1. Chemical analysis gave a composition of: 5.86 wt. % Fe; 6.17% Na; 27.01% SiO$_2$;4.81% Al representing a stoichiometry of:

0.95Na$_2$O:(Al$_{.63}$, Fe$_{.37}$)$_2$O$_3$:6.8SiO$_2$

Indexing of the X-ray diffraction pattern gave hexagonal unit cell values of a=18.26Å and c=7.65Å.

A second part of this gel (B) was reacted for five days at 100° C. after which time it yielded a similar ECR-23-T product to (A).

EXAMPLE 3

A gel composition of:

0.9(TMA)$_2$O:3.6Na$_2$O:0.5Al$_2$O$_3$:0.5Cr$_2$O$_3$:9SiO$_2$:135H$_2$O was made in a similar manner to that described for Example 2 except that the ingredients were as follows:

| |
|---|
| 2.9 gm Al$_2$O$_3$.3H$_2$O (Alcoa C31 alumina) |
| 70.3 gm Sodium silicate (P.Q. Corp. N. Brand) |
| 10.3 gm CrCl$_3$.6H$_2$O |
| 2 gm NaOH |
| 25.4 gm 25 wt % solution tetramethylammonium hydroxide |
| 32.8 gm H$_2$O |
| 6.3 gm Example 1 slurry seeds |

Sodium silicate, seeds, sodium aluminate (Al$_2$O$_3$ dissolved in NaOH solution), TMAOH and CrCl$_3$ solution were added in order with vigorous mixing. The final gel was heated at 150° C. for 16 hours, then cooled, filtered, washed with water and dried. X-ray diffraction analysis of the product gave the spectrum shown in FIG. 1 and Table 2. Indexing of this pattern gave a hexagonal unit cell value of a=18.19Å and c=7.62Å. Chemical analysis gave an element composition of: 3.94 wt. % Al; 6.41% Na; 23.5% Si; 7.36% Cr representing a crystal stoichiometry of:

0.97Na$_2$O:(Al$_{.51}$Cr$_{.49}$)$_2$O$_3$:5.82SiO$_2$

Thermogravimetric analysis gave a water content of 16 wt %, and a characteristic burn-off the occluded TMA at 570° C., representing 3 wt %.

TABLE 2

| hkl | Standard Al Mazzite dÅ | Standard Al Mazzite I/Io | Example 2 dÅ | Example 2 I/Io | Example 3 dÅ | Example 3 I/Io |
|---|---|---|---|---|---|---|
| 100 | 15.92 | 11 | 15.89 | 19 | 15.81 | 20 |
| 110 | 9.14 | 100 | 9.14 | 81 | 9.12 | 94 |
| 200 | 7.91 | 38 | 7.93 | 30 | 7.89 | 34 |
| 101 | 6.90 | 40 | 6.90 | 65 | 6.87 | 44 |
| 210 | 5.98 | 43 | 5.98 | 54 | 5.96 | 56 |
| 201 | 5.50 | 8 | 5.50 | 9 | 5.48 | 10 |
| 300 | 5.27 | 10 | 5.27 | 11 | 5.26 | 17 |
| 211 | 4.71 | 42 | 4.71 | 50 | 4.69 | 49 |
| 310 | 4.38 | 3 | 4.39 | 8 | 4.37 | 5 |
| 400 | 3.95 | 14 | 3.95 | 18 | 3.94 | 14 |
| 311 | 3.81 | 99 | 3.81 | 100 | 3.79 | 100 |
| 102 | 3.72 | 28 | 3.72 | 31 | 3.70 | 35 |
| 320 | 3.62 | 34 | 3.63 | 28 | 3.61 | 27 |
| 112 | 2.53 | 72 | 3.53 | 70 | 3.51 | 71 |
| 202 | 3.44 | 15 | 3.44 | 21 | 3.43 | 31 |
| 321 | 3.27 | 6 | 3.28 | 7 | 3.27 | 13 |
| 500 | 3.16 | 75 | 3.16 | 69 | 3.15 | 96 |
| 302 | 3.09 | 26 | 3.10 | 25 | 3.08 | 39 |
| 330 | 3.04 | 30 | 3.04 | 26 | 3.03 | 43 |
| 420 | 2.99 | 18 | 2.99 | 17 | 2.98 | 27 |
| 501 | 2.92 | 78 | 2.92 | 75 | 2.91 | 87 |
| 510 | 2.84 | 6 | 2.840 | 7 | 2.83 | 13 |
| 511 | 2.660 | 9 | 2.662 | 12 | 2.653 | 10 |
| 600 | 2.632 | 9 | 2.663 | 12 | 2.662 | 10 |
| 520 | 2.524 | 11 | 2.530 | 10 | 2.522 | 8 |
| 601 | 2.488 | 6 | — | — | 2.481 | 6 |
| 332 | 2.380 | 8 | 2.380 | 7 | 2.372 | 9 |
| 440 | 2.279 | 10 | 2.281 | 8 | 2.273 | 10 |
| 403 | 2.142 | 9 | 2.142 | 9 | 2.134 | 8 |
| 621 | 2.105 | 6 | 2.105 | 8 | 2.099 | 6 |

EXAMPLE 4

A typical synthetic aluminosilicate mazzite was prepared as a standard comparison with the novel metalloaluminosilicate compositions of this invention using a gel formulation of:

0.5(TMA)$_2$O:2.75Na$_2$O:Al$_2$O$_3$:9SiO$_2$:140H$_2$O:1.08Na$_2$SO$_4$ reacted at 150° C. for one day in a Teflon lined Parr autoclave. The product had a stoichiometry of 0.81 Na$_2$O:Al$_2$O$_3$:5.66SiO$_2$ after burning out the TMA template at 550° C. for 3 hours.

To make a catalyst, 15 gm. of this sample was exchanged with a solution of 15 gm. ammonium chloride dissolved in 120 gm distilled water at 60° C. for one hour; filtered on a vacuum filter, washed with 150 ml. 10% ammonium chloride solution on the filter followed by 300 ml. distilled water. The sample was calcined for six hours at 320° C. in an air oven, and then given a second slurry ammonium chloride exchange in a like manner to the first exchange. This time the sample was air dried on the filter, then reslurried with 100 ml. aqueous ammonia (29% NH$_3$) for 30 minutes, followed by filtration, washing on the filter with 100 ml. distilled water, and drying at 110° C. in an air oven. 12 gm. of this sample were exchanged to a Pt (metal) level of about 1% by contacting it with a solution of 0.212 gm. Pt(NH$_3$)$_4$Cl$_2$ dissolved in 41 ml. aqueous ammonia for 20 minutes at room temperature; filtered on a vacuum filter, then air dried on the filter, followed by 1.5 hours in an air oven at 110° C. This sample was then formed into one inch tablets in a Carver Press and these were then crushed and sieved to a particle size range of 0.2 to 0.4 mm. The sample was then placed in a vacuum oven at 50° C., ramped to 250° C. in one hour, and held at 250° C. for one hour, at which time the temperature reduced to 150° C. 4 gm. of this catalyst was weighed into a dish and placed in a desiccator containing 3A (i.e. K-LTA) molecular sieves.

This 4 gm catalyst sample was then loaded into a 0.5 inch diameter stainless steel reactor, and topped to 12 cm. bed depth with 0.1 to 0.2 mm diameter glass beads. Reactor start-up procedures ramped the temperature to 454° C. at a rate of 3° C./minute under a hydrogen flow rate of 100 ml/min. STP (10 barG. pressure), and held the reactor at this temperature for 15 minutes before reducing the temperature to the operational temperature. At this time the n-hexane feed was introduced into the hydrogen stream to give an n-hexane equivalent space velocity (WHSV) of 2, a $H_2$/n-hexane of 2.5, and a pressure of 10 barG. Samples were recovered and analyzed on line by gas chromatography at appropriate times. These results are shown in Table 3.

EXAMPLE 5

A reaction mixture having the following oxide ratios:

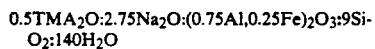

$0.5TMA_2O:2.75Na_2O:(0.75Al,0.25Fe)_2O_3:9SiO_2:140H_2O$ was made by first making a sodium aluminate solution by dissolving 75 g. aluminum oxide trihydrate in a solution containing 59 g. NaOH and 100 ml. $H_2O$. After cooling down, the solution was diluted to 250 g. with distilled $H_2O$. In a beaker were mixed 256.8 g. of sodium silicate (P.Q. Corp., N brane, 28.7% $SiO_2$;8.9% $Na_2O$), 18.2 g. of a "seed" solution (13.33$Na_2O$:$Al_2O_3$:12.5$SiO_2$:267$H_2O$, see U.S. Pat. Nos. 3,574,538 and 4,340,573), and 45.3 g. of sodium aluminate solution. Swirled in 51.1 g. of 25% aq. TMAOH, 19.9 g. of $Al_2(SO_4)_3 \cdot 17H_2O$ in 19.9 g. $H_2O$, and 18.9 g. $FeCl_3 \cdot 6H_2O$ in 25 mls. $H_2O$. The total weight of the mixture was adjusted to 500 g. by addition of $H_2O$, and then thoroughly homogenized in a blender. The mixture was then placed in four 125 ml. teflon lined autoclaves and reacted at 150° C. for two days. The product was filtered, washed with distilled $H_2O$, and dried in a 115° C. oven. X-ray powder diffraction analysis showed the crystalline phase to be excellent ECR-23T. Elemental analysis by ICP-AES and AA gave 5.84% Na; 25.4% Si; 6.53% Al; 4.60% Fe. This represents a product stoichiometry of

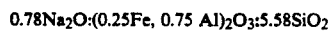

$0.78Na_2O:(0.25Fe, 0.75 Al)_2O_3:5.58SiO_2$ 15 gm. of this iron aluminosilicate mazzite product was exchanged with a solution of 15 gm. ammonium chloride dissolved in 120 gm. distilled water at 60° C. for one hour; filtered on a vacuum filter, washed with 150 ml. 10% ammonium chloride solution on the filter followed by 300 ml. distilled water. The sample was calcined for six hours at 320° C. in an air oven, and then given a second slurry ammonium chloride exchange in a like manner to the first exchange. The sample was air dried on the filter, then reslurried with 100 ml. aqueous ammonia (29% $NH_3$) for 30 minutes, followed by filtration, washing on the filter with 100 ml. distilled water, and drying at 110° C. in an air oven. This sample was formed into one inch tablets in a Carver Press and these were then crushed and sieved to a particle size range of 0.2 to 0.4 mm. The sample was then placed in a vacuum oven at 50° C., ramped to 250° C. in one hour, and held at 250° C. for one hour, at which time the temperature was reduced to 150° C. 4 gm. of this catalyst was weighed into a dish and placed in a desiccator containing 3A (i.e. K-LTA) molecular sieves. (note that this catalyst does not contain platinum). Catalytic results for this catalyst, obtained in an similar to those for Example 4, are compared with the same for Example 4 in Table 3. This is essentially an inactive catalyst compared to either the previous or following examples, and demonstrates that iron has no detrimental effects under these reaction conditions.

EXAMPLE 6

15 gm of this iron aluminosilicate mazzite product of Example 5 was converted into a Pt co-promoted catalyst by first exchanging with a solution of 15 gm. ammonium chloride dissolved in 120 gm distilled water at 60° C. for one hour; filtered on a vacuum filter, washed with 150 ml. 10% ammonium chloride solution on the filter followed by 300 ml. distilled water. The sample was calcined for six hours at 320° C. in an air oven, and then given a second slurry ammonium chloride exchange in a like manner to the first exchange. This time the sample was air dried on the filter, then reslurried with 100 ml. aqueous ammonia 29% $NH_3$) for 30 minutes, followed by filtration, washing on the filter with 100 ml. distilled water, and drying at 110° C. in an air oven. 9.6 gm. of this sample were exchanged to a Pt (metal) level of about 1% by contacting it with a solution of 0.175 gm. $Pt(NH_3)_4Cl_2$ dissolved in 35 ml. aqueous ammonia for 20 minutes at room temperature; filtered on a vacuum filter, then air dried on the filter, followed by 1.5 hours in an air oven at 110° C. This sample was then formed into one inch tablets in a Carver Press and these were then crushed and sieved to a particle size range of 0.2 to 0.4 mm. The sample was then placed in a vacuum oven at 50° C., ramped to 250 in one hour, and held at 250° C. for one hour, at which time the temperature was reduced to 150° C. 4 gm. of this catalyst was weighed into a dish and placed in a desiccator containing 3A (i.e. K-LTA) molecular sieves.

This catalyst was evaluated using the identical procedure to that used for Examples 4 and 5, with which they are compared in Table 3. The co-promoted catalyst of this example is essentially identical in activity and selectivity to Example 4, despite the heavy loading of ferric iron in the zeolite framework. In the conversion of sulfur containing feedstocks, the presence of iron in the catalyst of this example should sufficiently protect the noble metal from sulfur poisoning so as to yield superior product distributions. After over 18 hours on oil the catalyst showed no signs of aging, indicated by constant and steady yield patterns at several temperatures.

These results show that the unique trivalent framework substituted metallo-aluminosilicates of this invention, co-promoted with noble metals, are improved over the original hydrocarbon conversion catalysts compositions. The incorporation of high sulfur affinity transition metals in the zeolite framework is a novel approach to sulfur resistant catalyst formulations.

Having thus described the invention and provided examples showing the synthesis and the product, it should be apparent to those having ordinary skill in this

TABLE 3

| Catalyst | Example 4 | Example 4 | Example 4 | Example 5 | Example 5 | Example 6 | Example 6 | Example 6 | Example 6 |
|---|---|---|---|---|---|---|---|---|---|
| Temperature | 310 | 360 | 380 | 360 | 380 | 310 | 340 | 360 | 380 |
| Time on oil | 10 hr. | 12 hr | 17 hr | 3 hr | 8 hr | 4 hr | 16 hr | 11 hr | 14 hr |
| Conversion | 6.8 | 48.6 | 72.64 | 5.55 | 3.85 | 4.61 | 30.66 | 52.85 | 69.76 |
| C1 | 0.13 | 0.47 | 0.45 | 0 | 0.02 | 0 | 0.05 | 0.06 | 0.11 |
| C2 | 0.19 | 0.64 | 0.59 | 0.06 | 0.07 | 0 | 0.06 | 0.12 | 0.3 |
| C3 | 0.69 | 2.41 | 3.71 | 1.34 | 1.26 | 0.07 | 1.05 | 2.64 | 7.09 |
| i-C4 | 0.02 | 0.27 | 0.66 | 0.83 | 0.33 | 0.03 | 0.63 | 1.55 | 3.2 |
| n-C4 | 0.35 | 1.04 | 0.99 | 0.53 | 0.27 | 0.03 | 0.32 | 0.77 | 1.79 |
| i-C5 | 0.03 | 0.45 | 0.97 | 0.53 | 0.23 | 0.02 | 0.5 | 1.34 | 3.13 |
| n-C5 | 0.41 | 0.93 | 0.76 | 0.31 | .12 | 0.04 | 0.25 | 0.59 | 1.44 |
| 2,2-DMB | 0.04 | 3.23 | 9.21 | 0.05 | 0.03 | 0.03 | 1.1 | 3.63 | 5 |
| 2,3-DMB | 0.15 | 2.24 | 5.51 | 0.24 | 0.18 | 0.22 | 2.48 | 3.92 | 5.22 |
| 2-MeC5 | 2.6 | 21.38 | 28.49 | 0.79 | 0.52 | 2.2 | 14.31 | 22.58 | 24.75 |
| 3-MeC5 | 2.05 | 15.06 | 20.23 | 0.66 | 0.55 | 1.84 | 9.81 | 15.4 | 17.32 |
| n-C6(feed) | 93.2 | 51.4 | 27.36 | 94.45 | 96.15 | 95.4 | 69.34 | 47.15 | 30.24 |
| Mecyclo-C5 | 0.14 | 0.36 | 0.63 | 0.11 | 0.11 | 0.12 | 0.12 | 0.13 | 0.16 |
| Benzene | 0 | 0.07 | 0.28 | 0 | 0.11 | 0 | 0 | 0.03 | 0.12 |
| cyclo-C6 | 0 | 0.07 | 0.08 | 0 | 0 | 0 | 0 | 0 | 0 |

What is claimed is:

1. A crystalline microporous transition-metal-aluminosilicate having a mazzite-like structure and wherein at least one trivalent transition-metal selected from the group of Fe, Cr and mixtures thereof, is in the tetrahedral position of the transition-metal-aluminosilicate.

2. The transition-metal-aluminosilicate of claim 1 having the following chemical composition:

$$xR_2O:(1-x)Na_2O:yT_2O_3:(1-y)Al_2O_3:3-20SiO_2$$

where
x is between 0.05 and 0.4,
y is between 0.05 and 0.7,
R is selected from one or more of tetramethylammonium, bis-dihydroxyethyl-dimethylammonium, triethylene diamine, choline, pyrrolidine, and 1,4 diazobicyclo (2,2,2) octane, and T is the trivalent transition metal Fe or Cr or mixtures thereof.

3. The transition-metal-aluminosilicate of claim 2 wherein T is Fe.

4. The transition-metal-aluminosilicate of claim 2 wherein T is Cr.

5. The transition-metal-aluminosilicate of claim 2 wherein T is a mixture of Fe and Cr.

6. The transition-metal-aluminosilicate of claim 2 wherein T further includes Zn so that T is a mixture of Fe and Zn.

7. The transition-metal-aluminosilicate of claim 2 wherein T further includes Zn so that T is a mixture of Cr and Zn.

8. The transition-metal-aluminosilicate of claim 1 which has been at least partially ion exchanged with a cation selected from the group consisting of Groups I through VIII of the Periodic Table, the rare earth metals, ammonium cation, and combinations thereof.

9. The transition-metal-aluminosilicate of claim 8 which has been exchanged with metal cations selected from the group consisting of barium, calcium, cesium, lithium, magnesium, sodium, potassium, strontium, zinc, and combinations thereof.

10. The transition-metal-aluminosilicate of claim 1 further comprising at least one divalent transition metal in the tetrahedral position of the composition selected from the group consisting of Ni, Co, Zn, and combinations thereof.

11. The transition-metal-aluminosilicate of claim 10 having the formula:

$$xR_2O:(1-x)Na_2O:(1-b)(T_yAl_{1-y})_2bDO:3 \text{ to } 20SiO_2$$

where
y is between 0.05 and 0.7,
R is selected from one or more of tetramethylammonium, bis-dihydroxyethyldimethylammonium, triethylene diamine, choline, pyrrolidine, and 1,4 diazo-bicyclo (2,2,2) octane, T is the trivalent transition metal Fe or Cr or mixtures thereof,
D is Zn, and
$0.01 \leq b < 0.5$.

12. The transition-metal-aluminosilicate of claim 11 wherein T is Fe.

13. The transition-metal-aluminosilicate of claim 11 wherein T is Cr.

14. The transition-metal-aluminosilicate of claim 11 which has been at least partially ion exchanged with a cation selected from the group consisting of Groups I through VIII of the Periodic Table, the rare earth metals, an ammonium cation, alkylammonium cation, and combinations thereof.

15. The transition-metal-aluminosilicate of claim 14 which has been exchanged with one or more metal cations selected from the group consisting of barium, calcium, cesium, lithium, magnesium, sodium, potassium, strontium, zinc, and combinations thereof.

16. A process for producing a microporous transition-metal-aluminosilicate hydrocarbon conversion catalyst having a mazzite-like structure and substantial transition metal, Cr or Fe or mixtures thereof, within the tetrahedral framework of the transition-metal-aluminosilicate, comprising the steps of:
preparing a reaction mixture comprising an alumina source, a silica source, a transition-metal source of Cr or Fe or mixtures thereof, a sodium oxide source, an organic template, and a seed source, with substantial mixing,
maintaining the reaction mixture at a temperature and for a time sufficient to crystallize said transition-metal-aluminosilicate, recovering said transition-metal-aluminosilicate, and calcining to remove the occluded organic template.

17. The process of claim 16 wherein the reaction mixture has a composition, in terms of mole ratios of oxides, within the following ranges:

| | |
|---|---|
| $SiO_2:Al_2O_3$ | 3 to 30 |
| $T_2O_3:Al_2O_3$ | 0.02 to 4 |
| $Na_2O:(Al_2O_3 + T_2O_3)$ | 1.4 to 6.0 |
| $H_2O:(Al_2O_3 + T_2O_3)$ | 80 to 400 |
| $R_2O:(Al_2O_3 + T_2O_3)$ | 0.02 to 3.0 | wherein T is Fe or Cr or mixtures thereof.

18. The process of claim 17 wherein the reaction mixture has a composition, in terms of mole ratios of oxides, within the following ranges:

| | |
|---|---|
| $Na_2O:(Al_2O_3 + T_2O_3)$ | 4 to 15 |
| $SiO_2:Al_2O_3$ | 0.02 to 2 |
| $T_2O_3:Al_2O_3$ | 1.8 to 4 |
| $H_2O:(Al_2O_3 + T_2O_3)$ | 100 to 250 |
| $R_2O:(Al_2O_3 + T_2O_3)$ | 0.02 to 1.0 | wherein T is Cr or Fe or mixtures thereof.

19. The process of claim 16 wherein the sodium oxide source and alumina source are introduced into the reaction mixture as sodium aluminate.

20. The process of claim 16 wherein the transition-metal source is an aqueous solution of strong acid and a salt.

21. The process of claim 20 wherein the reaction mixture is maintained at a temperature between about 70° C. and 250° C.

22. The process of claim 21 wherein the reaction mixture is maintained at a temperature of between about 90° and 180° C. for a time of about 12 to about 24 hours.

23. The process of claim 17 wherein T is Fe.

24. The process of claim 17 wherein T is Cr.

25. The process of claim 17 wherein the reaction mixture also contains a divalent transition metal source in an amount to yield $DO:(Al_2O_3+T_2O_3)$ of 0 to 4.0, wherein D is zinc.

26. The process of claim 18 wherein the reaction mixture also contains a divalent transition metal source in an amount to yield $DO:(Al_2O_3+T_2O_3)$ of 0–2.0, wherein D is zinc.

27. A product of claim 1 post-treated with a solution of a noble metal of group 8 of the Periodic Table so as to deposit between 0.1 and 3.0% wt. of said metal within the catalyst.

28. A product of claim 27 wherein said metal is selected from the group consisting of Pt and Pd or a mixture of the two.

29. A product of claim 27 used as a hydrocarbon conversion catalyst.

30. A product of claim 28 used as a hydrocarbon conversion catalyst.

31. A product of claim 27 used as a catalyst in the conversion of n-paraffins to branched chain paraffins.

32. A product of claim 28 used as a catalyst in the conversion of a n-paraffin feedstock to branched paraffinic products.

* * * * *